US010007646B1

United States Patent
Colborn et al.

(10) Patent No.: US 10,007,646 B1
(45) Date of Patent: Jun. 26, 2018

(54) METHOD AND SYSTEM FOR PRESENTING MULTIPLE LEVELS OF CONTENT FOR A DOCUMENT

(71) Applicant: Nutanix, Inc., San Jose, CA (US)

(72) Inventors: Benjamin Joseph Colborn, Campbell, CA (US); Owen Edward Richter, Santa Clara, CA (US)

(73) Assignee: Nutanix, Inc., San Jose, CA (US)

( * ) Notice: Subject to any disclaimer, the term of this patent is extended or adjusted under 35 U.S.C. 154(b) by 2 days.

(21) Appl. No.: 15/086,983

(22) Filed: Mar. 31, 2016

Related U.S. Application Data

(60) Provisional application No. 62/143,008, filed on Apr. 3, 2015.

(51) Int. Cl.
*G06F 17/20* (2006.01)
*G06F 17/22* (2006.01)
*G06F 17/27* (2006.01)

(52) U.S. Cl.
CPC ...... *G06F 17/2241* (2013.01); *G06F 17/2247* (2013.01); *G06F 17/2705* (2013.01)

(58) Field of Classification Search
CPC ............. G06F 17/2229; G06F 17/2241; G06F 17/2247
See application file for complete search history.

(56) References Cited

U.S. PATENT DOCUMENTS

| | | | | |
|---|---|---|---|---|
| 2008/0059912 | A1* | 3/2008 | Scherpa | G06F 17/30126 715/853 |
| 2012/0030182 | A1* | 2/2012 | Claman | G11B 27/034 707/690 |
| 2013/0151941 | A1* | 6/2013 | Galassi | G06F 17/2288 715/229 |
| 2013/0151974 | A1* | 6/2013 | Cho | G06F 17/212 715/733 |
| 2014/0181644 | A1* | 6/2014 | Andreas | G06F 17/212 715/243 |
| 2016/0232143 | A1* | 8/2016 | Fickenscher | G06F 3/0482 |

* cited by examiner

*Primary Examiner* — Keith D Bloomquist
(74) *Attorney, Agent, or Firm* — Vista IP Law Group, LLP

(57) ABSTRACT

Disclosed is an improved approach to implement authoring and presentation of information to users in electronic formats. The document may include multiple hierarchical levels, where the entirety of a given hierarchical level is displayed along with each sub-level that is associated with selected level. The contents of the entire hierarchy of any portion of a hierarchy can be displayed inline at any given level of the document.

21 Claims, 18 Drawing Sheets

```
{ Title: "title of document"
  version: "1.0"
  documenttype:"Admin"
  software type: "Linux"
  hardwaretype:"all"
  documentdate:"March2015"
  documentpermission:"public"
  id: "doc_filename"
  unique key: "doc_filename : doc_filename"    ⎫
  ancestors: [ ]                                ⎬ 602
  body: "--title contents--"                    ⎭
  docs: [ { Title: "Chapter 1"
            id: "chunk1_filename"
            unique key: "doc_filename : chunk1_filename"       ⎫
            ancestors: [ "doc_filename :doc_filename" ]         ⎬ 604
            body: "--Chapter 1 contents--"                      ⎭
            docs: [ { Title: "Chapter 1, Section 1"
                      id: "chunk2_filename"
                      unique key: "doc_filename : chunk2_filename"    ⎫
                      ancestors: [                                     ⎪
                         "doc_filename:doc_filename",                  ⎬ 606
                         "doc_filename:chunk1_filename"                ⎪
                      ]                                                ⎭
                      body: "--Chapter 1, Section 1 contents--"
                      docs: [
                      . . .
```

FIG. 6

METHOD AND SYSTEM FOR PRESENTING MULTIPLE LEVELS OF CONTENT FOR A DOCUMENT

CROSS-REFERENCE TO RELATED APPLICATIONS

The present application claims the benefit of priority to U.S. Provisional Application No. 62/143,008, filed on Apr. 3, 2015, which is hereby incorporated by reference in its entirety.

BACKGROUND

The present application relates to techniques to present documentation in an electronic format, such as in a web browser or on an electronic reader. There are many reasons to want to be able to provide documentation in an electronic format. For example, one common reason is to provide technical documentation and manuals in a searchable way to users of technology products.

The standard approach for authoring information is to create reusable components (or chunks) of information that have affinity with some other components. Conventionally, this results in two types of presentations for documents. One approach is provide the entirety of the content as a single monolithic document (e.g., as a book), which may run into a large number of pages (such as a PDF file). A table of contents or index may be used to navigate to a desired location within the document, but one key disadvantage with this approach is that it is restricted to producing a single large all-or-nothing document. In addition, this presentation type is deficient because readers are not able to easily locate information relevant to their situation within the single large document.

Another approach is to create a fragmented document that keeps each and every portion of the document (e.g., the document sections and sub-sections) as a separate and distinct entity. When viewing a specific section of the document, "forward" and "back" buttons maybe used to navigate through the document. However, the drawback with this approach is that it breaks up the content into different sections that require the users to hunt and seek for the different portions of interest to the user, and therefore provides a presentation type that is not aligned with information-seeking behavior desired by users.

Therefore, there is a need for an improved approach to implement authoring and presentation of information to users in electronic formats.

SUMMARY

The present disclosure provides an improved approach to implement authoring and presentation of information to users in electronic formats. According to some embodiments, the document may comprise multiple hierarchical levels, where the entirety of a given hierarchical level is displayed along with each sub-level that is associated with selected level. The contents of the entire hierarchy of any portion of a hierarchy can be displayed inline at any given level of the document. This approach can be implemented by using dynamic chunking. This provides a distinct advantage over approaches that display each level by itself, even if there are numerous sub-levels. This is also advantageous over approaches that require an all-or-nothing monolithic document, since each of the different levels can be represented as a separate document having a different set of content to be displayed.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIG. 6 shows example content for the JSON document.

DETAILED DESCRIPTION

An improved approach is provided to implement authoring and presentation of information to users in electronic formats. According to some embodiments, the document may comprise multiple hierarchical levels, where the entirety of a given hierarchical level is displayed along with each sub-level that is associated with selected level. The contents of the entire hierarchy are displayed inline. This provides a distinct advantage over approaches that display each level by itself, even if there are numerous sub-levels. This is also advantageous over approaches that require an all-or-nothing monolithic document, since each of the different levels can be represented as a separate document having a different set of content to be displayed.

According to some embodiments, with a document structure of recursively nested information components, the information is dynamically chunked according to the reader's behavior. At publication time, the source components are translated to granular chunks with an index, then further compiled into a structured format that describes nesting and ancestry. This transformation does not necessitate any changes in upstream processes (research, authoring, review, etc.) and can be reused for any source document type. Taxonomy items that describe any characteristic of the components (such as audience, level of expertise, technology platform, software or hardware version) can be added at any level. Child components inherit taxonomy items from ancestors unless they are explicitly excluded or overridden. As with other presentation types, the information can be viewed in a single long document or addressed at the base component level.

With the present invention, multiple intermediate levels of presentation can be provided for the information. When the user selects an item from the table of contents, the component and all children components are displayed as a single chunk.

Figure 1A:
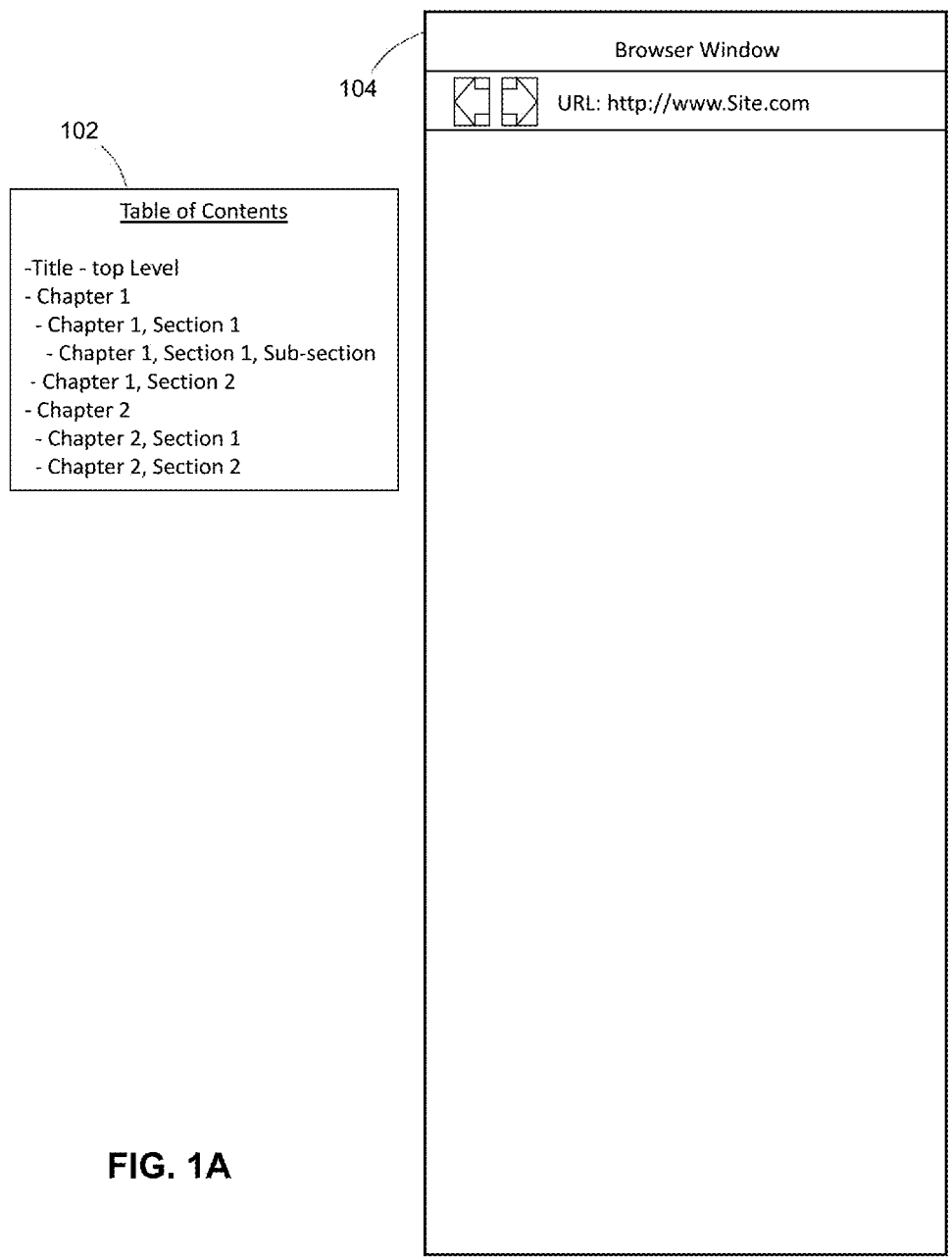
FIGS. 1A to 1I illustrate multiple intermediate levels of presentation.

FIGS. 1A to 1I illustrate this aspect of the invention. FIG. 1A shows a table of contents 102 for a document to be presented to a user within a web browser 104. The table of contents 102 pertains to a document having multiple sections and subsections, including a top level Title section. Beneath the Title section are "Chapter 1" and "Chapter 2" sub-sections. Within the "Chapter 1" subsection are additional sub-sections "Chapter 1, section 1" and "Chapter 1, section 2". The "Chapter 1, section 1" sub-section further includes its own subsection for "Chapter 1, Section 1, Sub-section". The "Chapter 2" subsection further includes additional sub-sections "Chapter 2, section 1" and "Chapter 2, section 2" beneath the "Chapter 2" section.

Figure 1B:
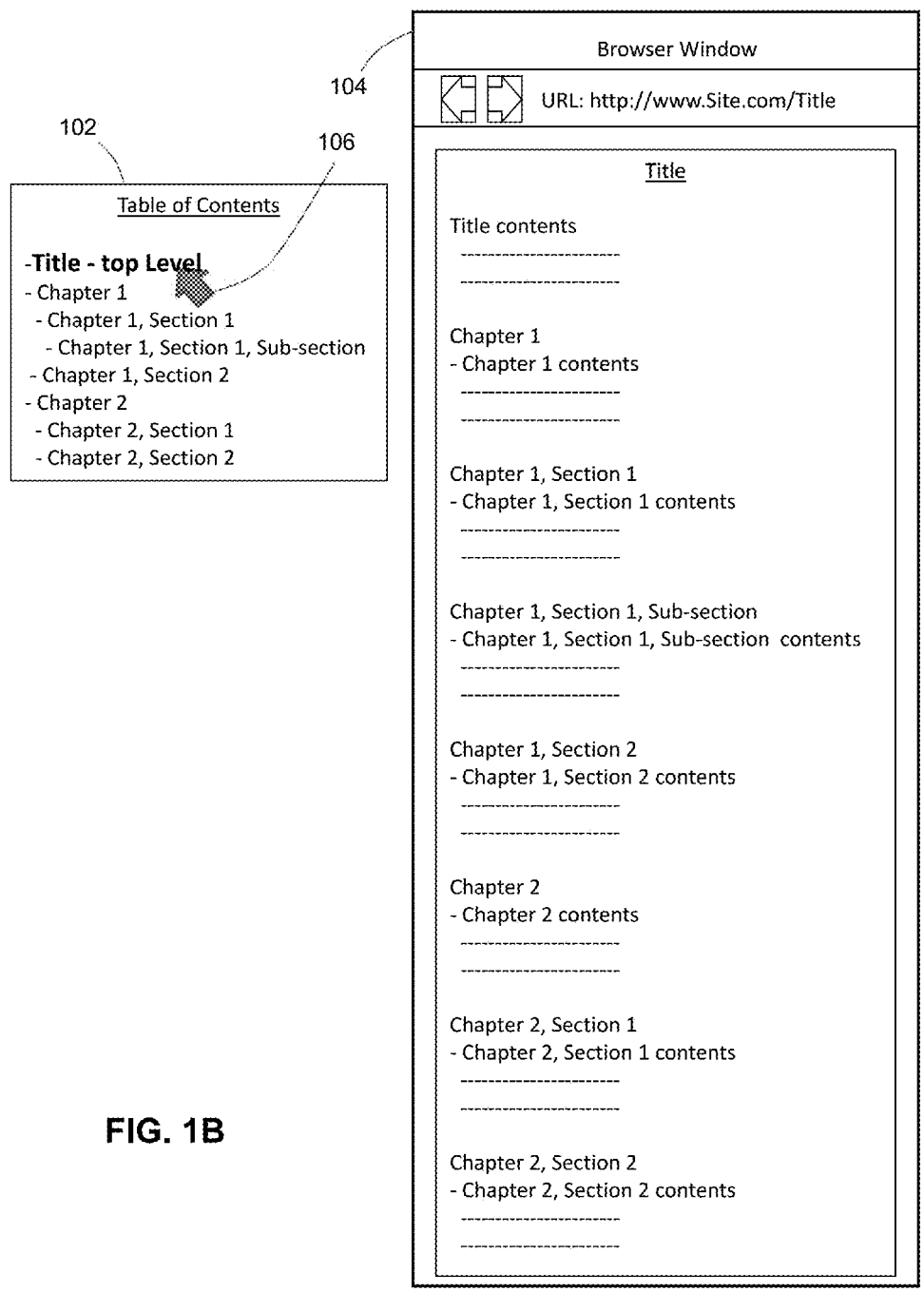

Any level of the document can be displayed with the entirety of the contents for that level plus all of the contents beneath that level. For example, as shown in FIG. 1B, consider if the user uses a mouse to control the mouse pointer 106 to select the top level of the document for display (selection of the Title section). Selection of the top level of the document would cause the entirety of the document to be displayed within the browser 104. This would include not just the contents of the Title section, but also the contents of every sub-section that hierarchically sits beneath the selected level. In this case, this means that the contents of the "Chapter 1", "Chapter 1, section 1", "Chapter 1, section 1, sub-section", "Chapter 1, section 2", "Chapter 2", "Chapter 2, section 1", and "Chapter 2, section 2" sub-sections would all be displayed as part of the display of the top "Title" section.

Figure 1C:
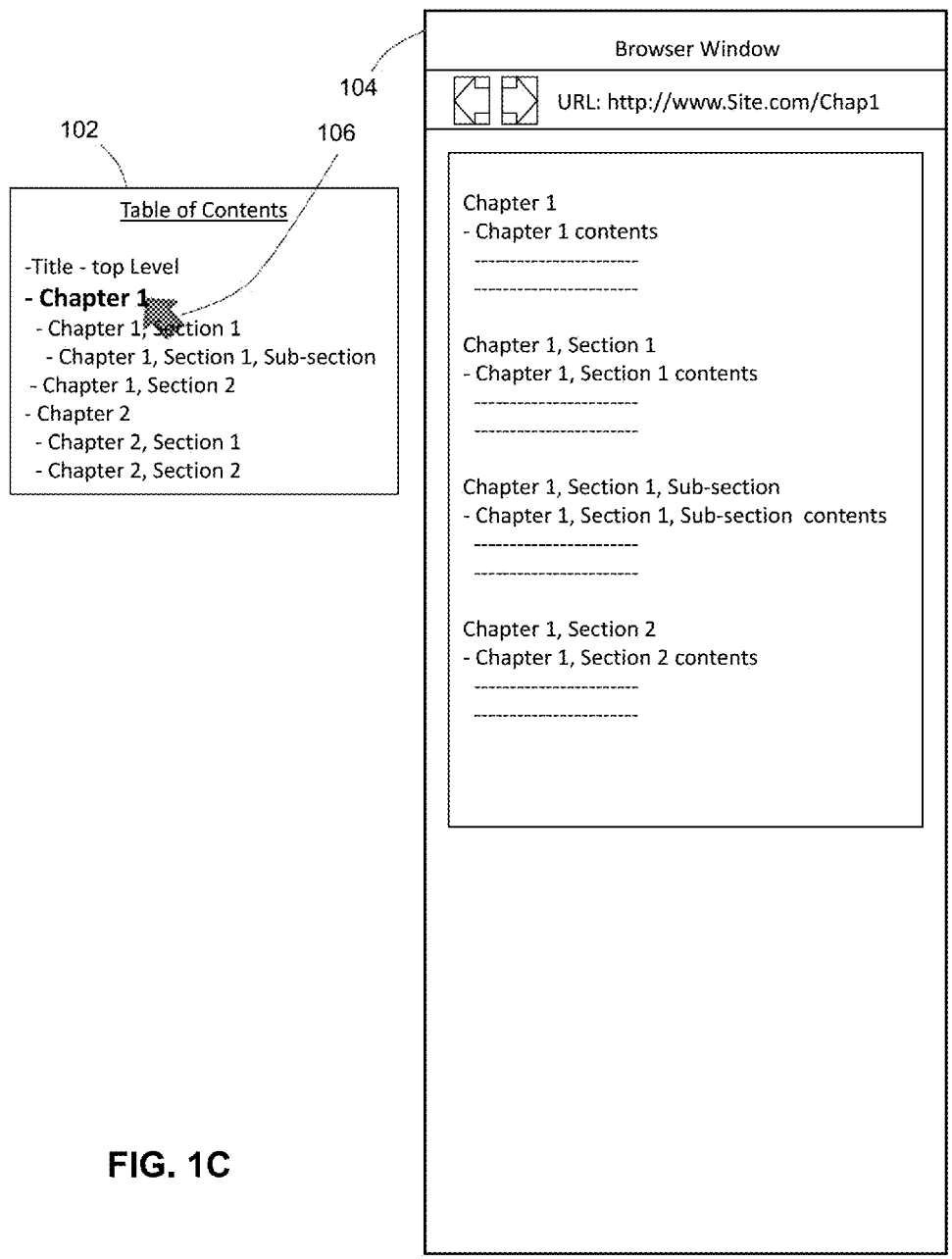

Selection of an intermediate level would display all of the contents for that intermediate level, plus its descendent levels as well (but not its parent levels). For example, FIG. 1C illustrates selection of the "Chapter 1" portion of the document. Selection of this level of the document would cause the contents of the "Chapter 1" section of the document to be displayed within the browser 104. This display of information would include not just the contents of the "Chapter 1" section, but also the contents of every sub-section that hierarchically sits beneath the selected section. In this case, this means that the contents of the "Chapter 1", "Chapter 1, section 1", "Chapter 1, section 1, sub-section", and "Chapter 1, section 2" sub-sections would all be displayed as part of the display of the top "Chapter 1" section.

Figure 1D:
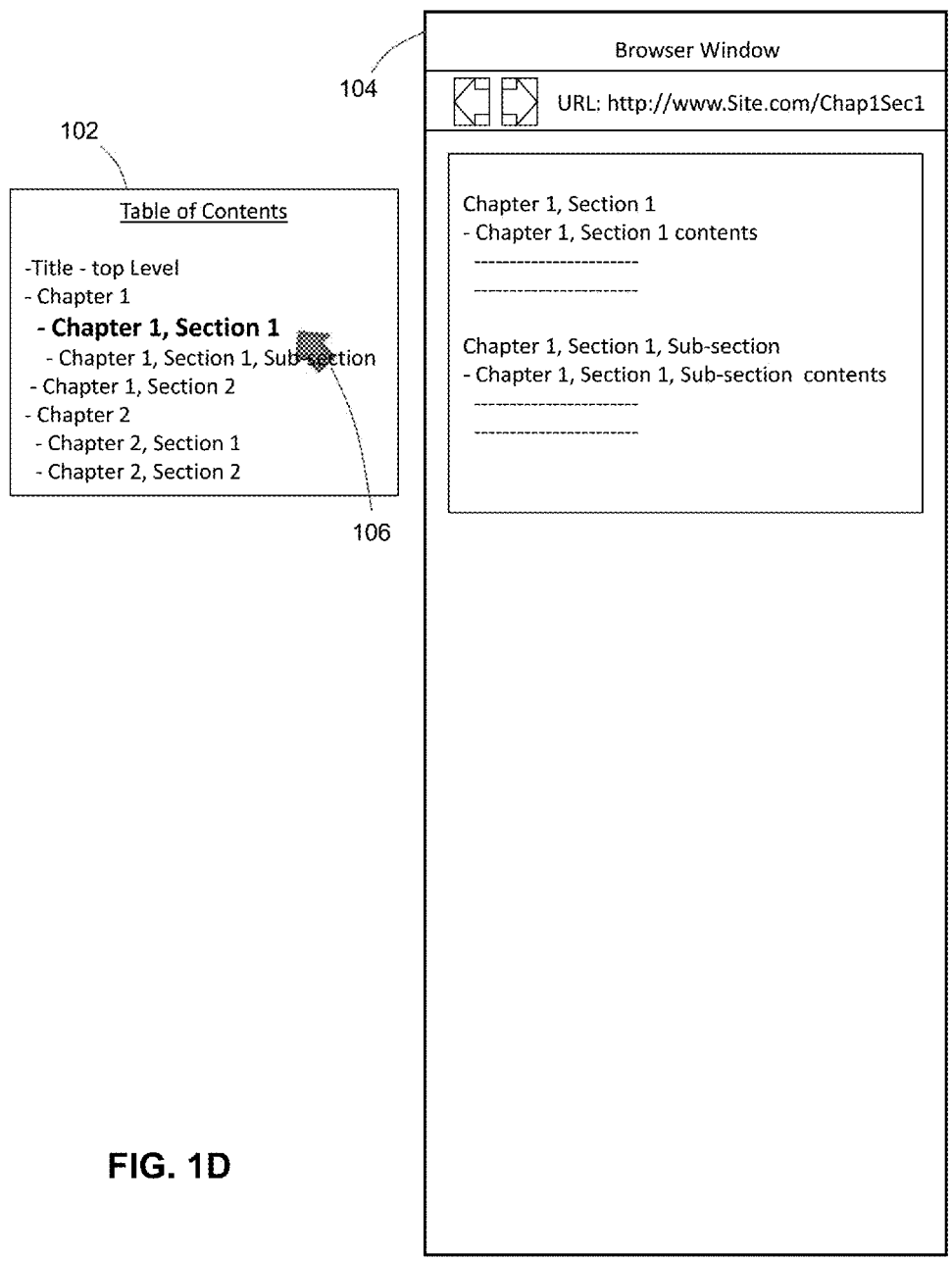

Any arbitrary number of intermediate levels can be displayed in this manner. For example, as shown in FIG. 1D, selection of the "Chapter 1, section 1" intermediate level of the document would cause the contents of the "Chapter 1, section1" section of the document to be displayed within the browser 104. This display of information would include not just the contents of the "Chapter 1, section1" section, but also the contents of every sub-section that hierarchically sits beneath the selected section. In this case, this means that the contents of the " "Chapter 1, section 1" and "Chapter 1, section 1, sub-section" sub-sections would all be displayed as part of the display of the top "Chapter 1" section.

Figure 1E:
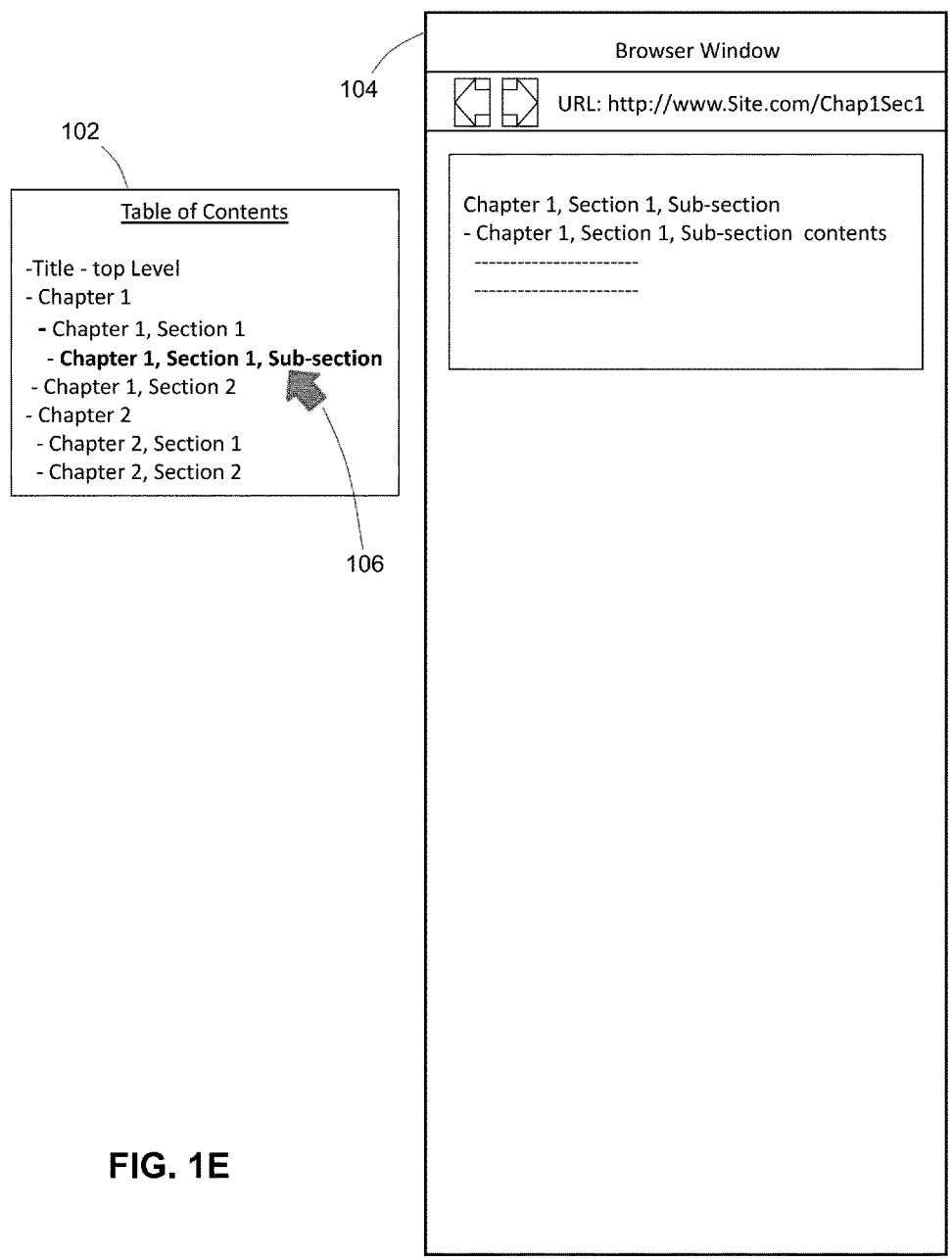
Figure 1F:
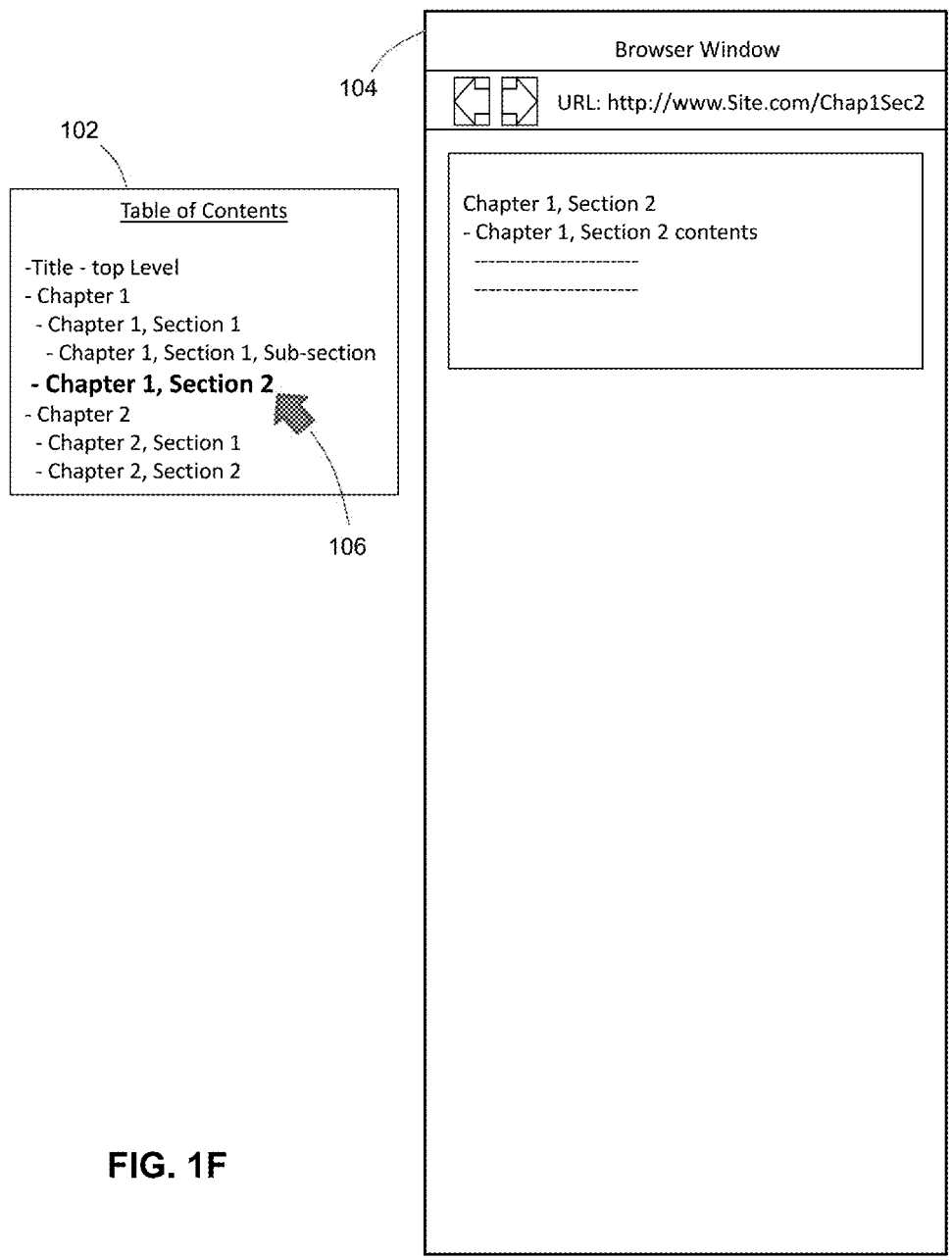

Selection of the lowest sub-sections would only display the contents of those sub-sections. For example, FIG. 1E illustrates selection of the "Chapter 1, Section 1, Sub-section" portion of the document. Selection of this level of the document would cause only the contents of the "Chapter 1, Section 1, Sub-section" portion of the document to be displayed within the browser 104, since there are no lower hierarchical levels beneath this selected section. Similarly, as shown in FIG. 1F, selection of the "Chapter 1, Section 2" portion of the document would cause only the contents of the "Chapter 1, Section 2" portion of the document to be displayed within the browser 104, since there are no lower hierarchical levels beneath this selected section.

Figure 1G:
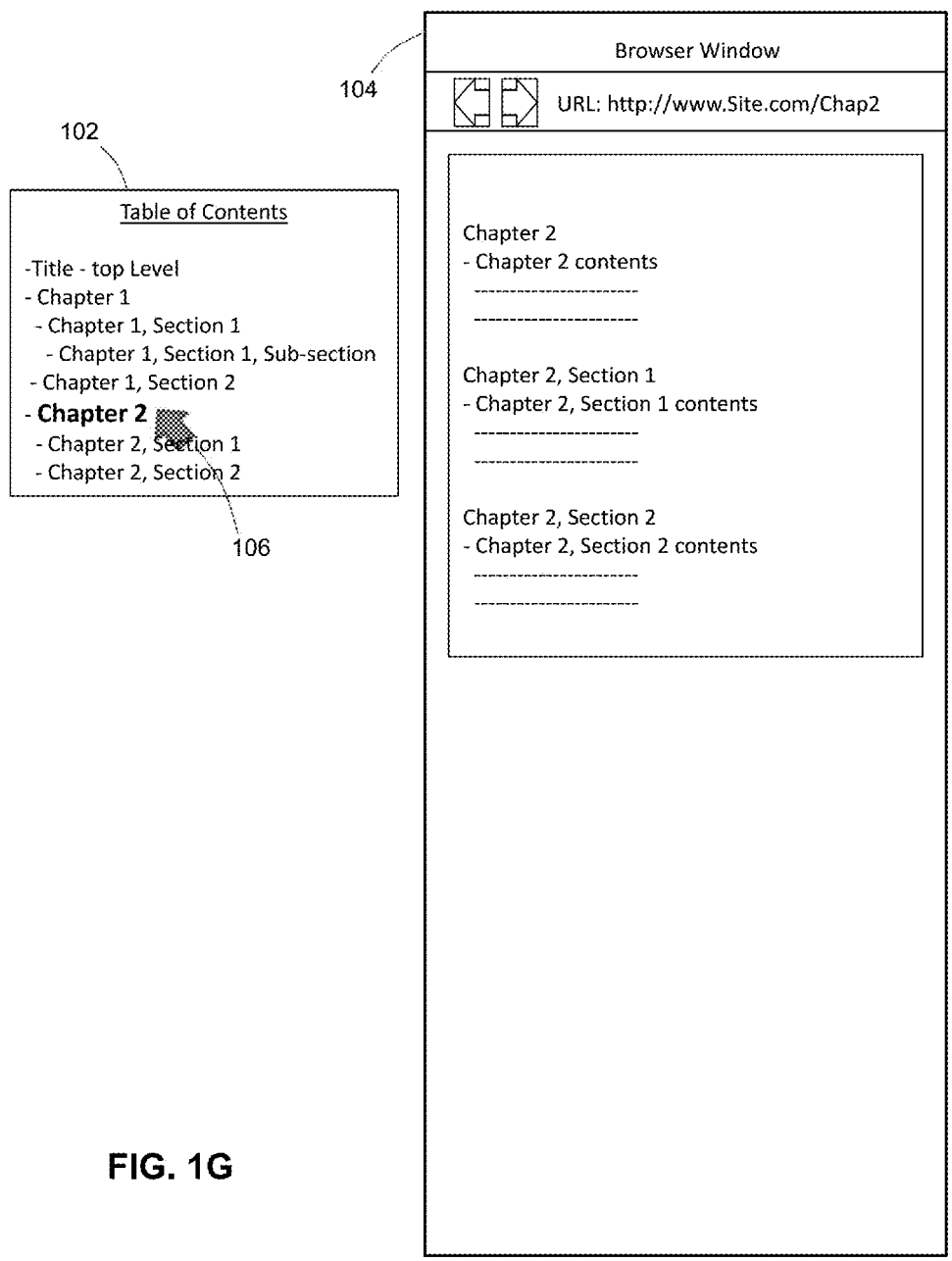

FIG. 1G illustrates selection of the "Chapter 2" portion of the document. Similar to what was described above for the selection of Chapter 1, selection of this level of the document would cause the contents of the "Chapter 2" section of the document to be displayed within the browser 104. This display of information would include not just the contents of the "Chapter 2" section, but also the contents of every sub-section that hierarchically sits beneath the selected section. In this case, this means that the contents of the "Chapter 2", and "Chapter 2, section 1", "Chapter 2, section 2" sub-sections would all be displayed as part of the display of the top "Chapter 2" section.

Figure 1H:
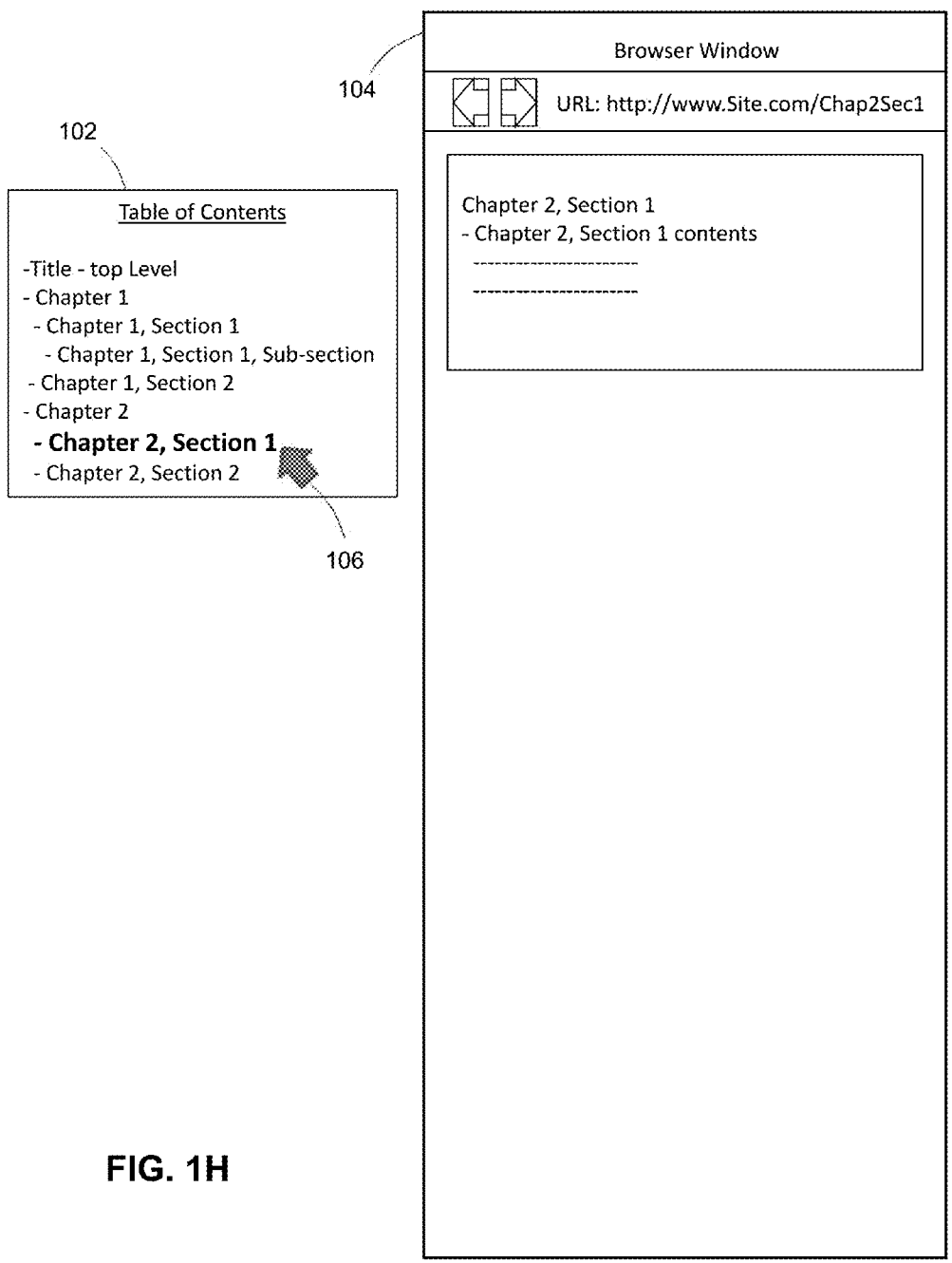
Figure 1I:
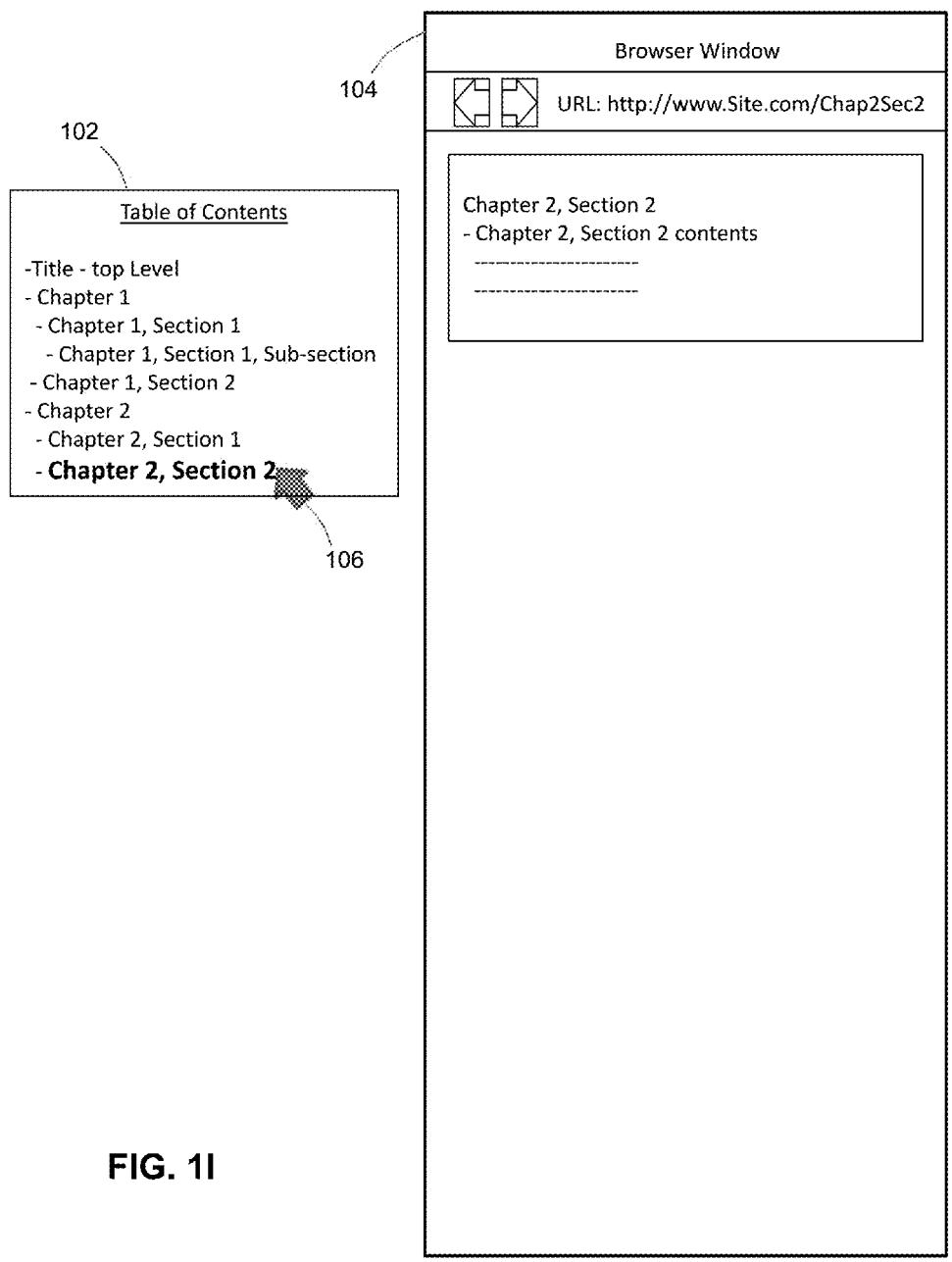

As before, selection of the lowest sub-sections for Chapter 2 would only display the contents of those sub-sections. For example, FIG. 1H illustrates selection of the "Chapter 2, Section 1" portion of the document which would cause only the contents of the "Chapter 2, Section 1" portion of the document to be displayed within the browser 104. As shown in FIG. 1I, selection of the "Chapter 2, Section 2" portion of the document would cause only the contents of the "Chapter 2, Section 2" portion of the document to be displayed within the browser 104.

It is noted that prior approach may exclusively create the highest level (as an all-or-nothing monolithic document) or exclusively create the lowest level (as a small individual chunk), but no conventional system creates all of these levels that includes all of the highest levels, lowest levels, and each intermediate level as well.

Figure 2:
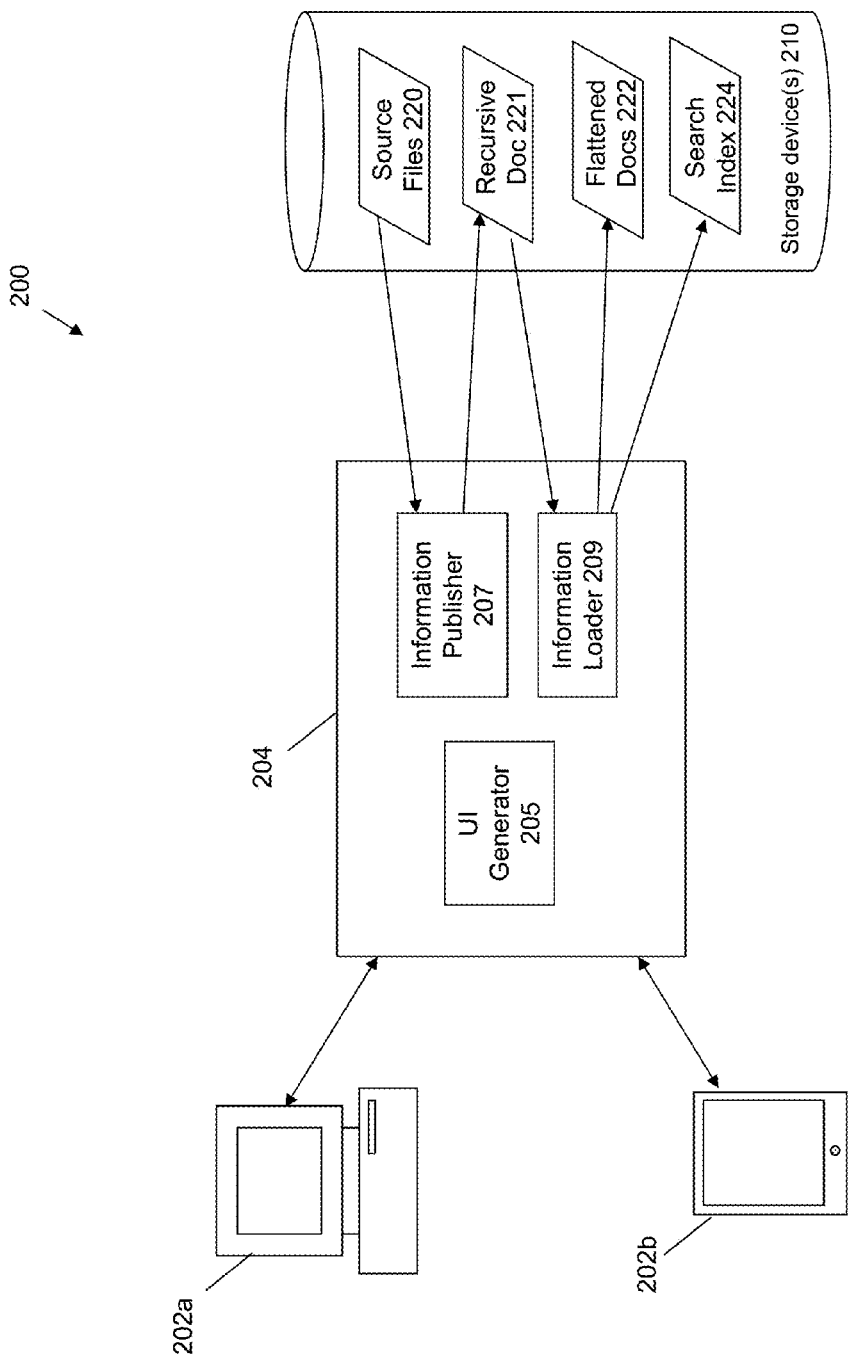
FIG. 2 shows an architecture of a system for implementing an improved information presentation system according to some embodiments of the invention.

FIG. 2 shows an architecture of a system 200 for implementing an improved information presentation system according to some embodiments of the invention. System 200 may include one or more users at one or more user stations 202a, one or more tablet devices 202b, or any other device that may be useful to access documents in an electronic way, e.g., such as one or more mobile computing or telephony devices. In system 200, user station 202a comprises any type of computing station that may be used to operate or interface with server 204. Examples of such user stations 202a include for example, workstations, personal computers, laptop computers, or remote computing terminals. Tablet device 202b comprises any type of portable tablet device, including for example, tablet computers, portable readers, etc. Mobile devices comprise any mobile device that can suitably access an application on application server 204, such as smartphones and programmable mobile handsets. User station 202a, tablet device 202b, and mobile devices usually include a display device, such as a display monitor or screen, for displaying scheduling data and interface elements to users. User station 202a, tablet device 202b, and/or mobile device may also comprise one or more input devices for the user to provide operational control over the activities of system 200, such as a mouse, touch screen, keypad, or keyboard.

The users operate the system 200 to access information provided by server 204. The information corresponds to data in any type of format suitable for presentation using an electronic display system. A user interface (UI) generator 205 is employed to generate data in a suitable format for presentation in the specific viewing mechanism usable by the user. In some embodiment, the viewing mechanism comprises a web browser and the UI generator 205 provides data formatted in the appropriate format for display in the web browser.

The server 204 includes an information publisher mechanism 207 that received source files 220 for the information to be presented, and converts those source files 220 into a recursive document 221 that provides an intelligently formatted information pertaining to the structure and contents of the different levels of information potentially to be sought by user at the user station. The information loader mechanism 209 takes the recursive document 221 and transforms the information in document 221 to generate one or more flattened documents 222 that correspond to each of the document levels to be presented to the user, such as the document levels shown in FIGS. 1B-1I. In addition, a search index 224 can be generated for searching and indexing of content within the flattened documents 222.

The source files 220, recursive document 221, search index 224, and/or flattened documents 222 may be stored in one or more computer storage devices 110. The storage device 110 corresponds to any type of computer readable mediums or device having any combination of hardware and software that allows for ready access to the data within storage device 110. For example, the computer readable storage device could be implemented as computer memory or disk drives operatively managed by an operating system or as a cloud-based storage service. In some embodiments, the transition from source files to the recursive document, and then from the recursive document to the flattened documents may result in storage of the data into different storage devices, e.g., from local system storage (source files) to a cloud storage service (recursive document) to a cloud-hosted database (flattened documents).

Figure 3:
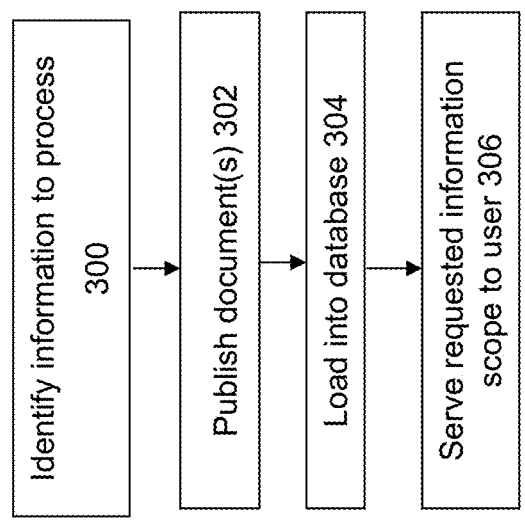
FIG. 3 shows a flowchart of a process for implementing information for display according to some embodiments of the invention.

FIG. 3 shows a flowchart of a process for implementing information for display according to some embodiments of the invention. At 300, identification is made of the information to process for display. In some embodiments, this action identifies a set of source files pertaining to a document of interest. The source files may be in any suitable format. For example, the source files may be implemented in the Darwin Information Typing Architecture (DITA), which is a common component-based platform for authoring technical information developed by IBM and now managed by OASIS. In DITA, components are assembled by means of a map, which is a list of nested components ("topics").

At 302, the source files are used to perform a publication action to generate a recursive document that provides intelligently formatted information pertaining to the structure and contents of the different levels of information potentially to be sought by user at the user station. Further details of the publication process are described below.

At 304, a loader mechanism is used to transform the recursive document into one or more flattened documents. Each of the flattened documents corresponds to a distinct level of the document to be presented to the user. These flattened documents are loaded into a database and made available to be served to the user. Further details of the loader process are described below. Thereafter, at 306, the appropriate flattened document is served to the user upon a selection of a specified level by the user.

Figure 4:
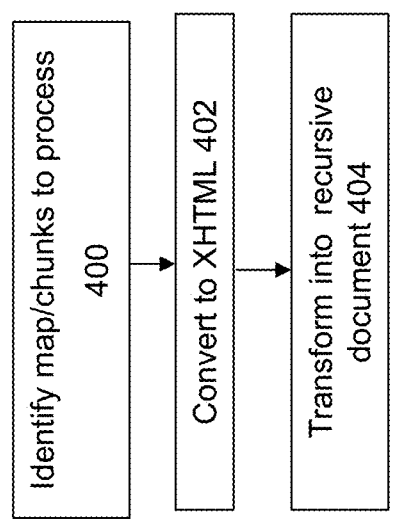
FIG. 4 shows a flowchart of an approach to implement the publication process.

FIG. 4 shows a flowchart of an approach to implement the publication process. At 400, identification is made of a map to process for publication. As noted above, the source files may be implemented in the DITA format, where the document corresponds to a set of different "chunks" (e.g., components or files), which are organized into a specific document by using a map that includes a list of nested components for the document. The map permits the different components to be organized differently depending upon the specific needs and purpose of the document, e.g., by configuring different combinations, contents, or ordering of the components/chunks. For example, an organization can create an "external" version of a document by configuring the map to include certain select chunks that are appropriate for public consumption, but can also create an "internal" version of the document by using the map to include all the available chunks into the document.

In some embodiments, the source files are implemented as XML files. At 402, the source files and the map are converted into XHTML. In some embodiments, this action is performed to generate the contents into a format that is more appropriate for use by a web browser.

At 404, the XHTML is transformed into a JSON (JavaScript Object Notation) file. The JSON file is constructed as a recursive document having fields that are pertinent for later loading process. The JSON file corresponds to a single recursive document that includes nested levels for the different portions of the overall document.

Figure 5:
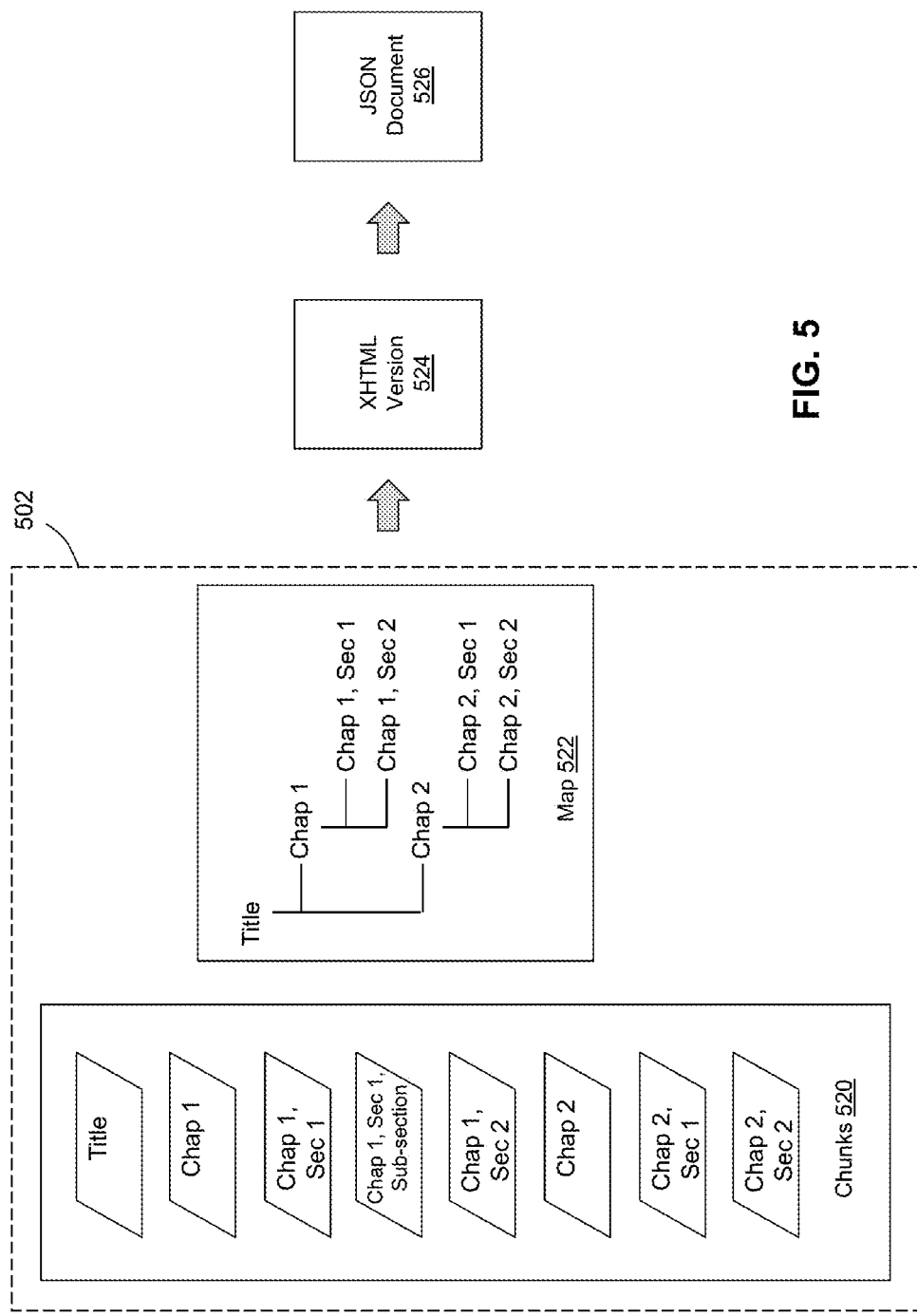
FIG. 5 provides an illustration of the publication process.

FIG. 5 provides an illustration of this process. The left portion 502 of this figure shows the chunks 520 and a map 522 for example document, e.g., the document described relative to FIGS. 1A-1I. The chunks 520 and map 522 are used as source files to generate XHTML content 524. The XHTML content 524 is transformed into a JSON document 526.

FIG. 6 shows example content for the JSON document. The JSON document is a single nested document that corresponds to the entirety of the end-document, having different portions for the different chunks represented by the document. For example, portion 602 corresponds to the chunk for the highest level "Title" section of the document, portion 604 correspond to the chunk for the "Chapter 1" section, portion 606 corresponds to the chunk for the "Chapter 1, Section 1" section of the document.

Each portion of the document includes a set of tags pertaining to different information about the chunk for that portion of the document. The following provides an example of certain tags/fields in the document in some embodiments:
{
  "title": "WebGuide",
  "documentType": "Administration",
  "softwareType": "Linux",
  "Version": "4.0",
  "hardwareType": "All",
  "documentDate": "2015-03-23",
  "documentPermission": "public",
  "id": "doc_filename",
  "uniqueKey": "doc_filename : doc_filename",
  "ancestors": []
  "body": " —contents—"
  , "documents": [{. . . ..}]

For example, the tags may pertain to information such as a "title" for the title of the document, "documenttype" for the type of document of interest, "softwaretype" for the type of software, "software version" for the version of interest, "hardwaretype" for pertinent hardware, "documentdate" for the date of the document.

The "documentpermission" tag pertains to permissions that can be set for the document, e.g., "public" or "private". This can be, for example, an inherited property that is inherited by each sub-level as well to the document. In fact, any of the above properties may be configured to be inherited properties.

The ID tag identifies the filename for the portion of interest in the document. The "unique key" tag pertains to a unique key within the scope of the document. This "unique key" can be used, for example, to create an addressable ID for the different levels of content to be displayed to the user (e.g., based upon top level filename and the current chunk's filename). Each of the final documents can be addressed by the filename which is unique among all documents, joined to the unique key, The "ancestor" tag identifies the direct ancestor of a given portion of the document. The ancestors field is generated at publish time and each sub-document has an ordered list of its entire ancestor hierarchy. In some embodiments, the value for this property is formed as a list of the unique keys for any ancestors.

The "body" tag pertains to the content of the document level for the given portion of the document. The "docs" tag is the part that recursively identifies the information for the nested portions of the document for the other chunks in the JSON file.

In some embodiments, many of the tags (e.g., documentType, softwareType, documentDate, documentPermission, etc . . . ) are automatically applied to the sub-documents at load time if they do not already exist in the sub-documents.

Each document can be represented as: "Title+Body +[A recursive concatenation of Title+Body]". The Table of Contents is dynamically generated from the recursive JSON structure at load time. Each sub-document is assigned the global table of contents so that even is a narrow or middle scope is displayed, you can still access the entire table of contents.

Each sub-document title is automatically turned into a hyperlink to its own sub-document as a part of the load process. Similarly, the ancestors field of each sub-document is used to populate the bread crumbs for navigation back up the hierarchy.

Figure 7:
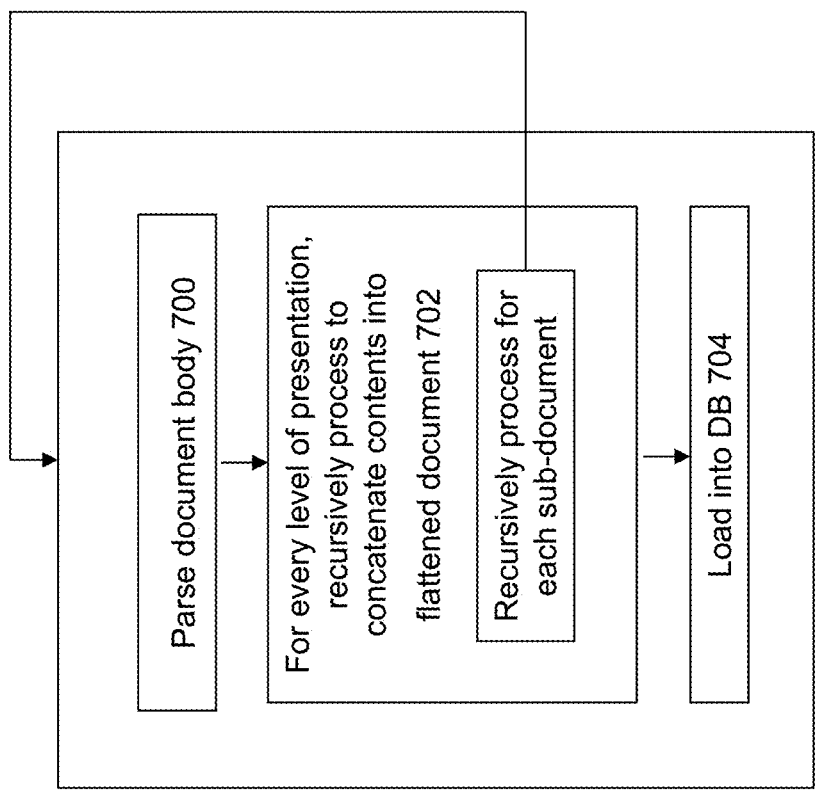
FIG. 7 shows a flowchart of an approach to perform the loading process.

FIG. 7 shows a flowchart of an approach to perform the loading process. At 700, the body of the JSON document is parsed. The loader goes through the body of the document, and at 702, creates a separate document for each level of the file. For each document, the portion in the JSON file pertinent to that document is concatenated with all of its levels hierarchically beneath it to generate a flattened document. This recursively takes the structure and appends the contents together for each level to recreate the HTML, from the JSON file for each level. This occurs recursively for each and every level of interest in the JSON document. At 704, the flattened documents are loaded into a database for access later by users seeking to view the different parts of the document.

Figure 8:
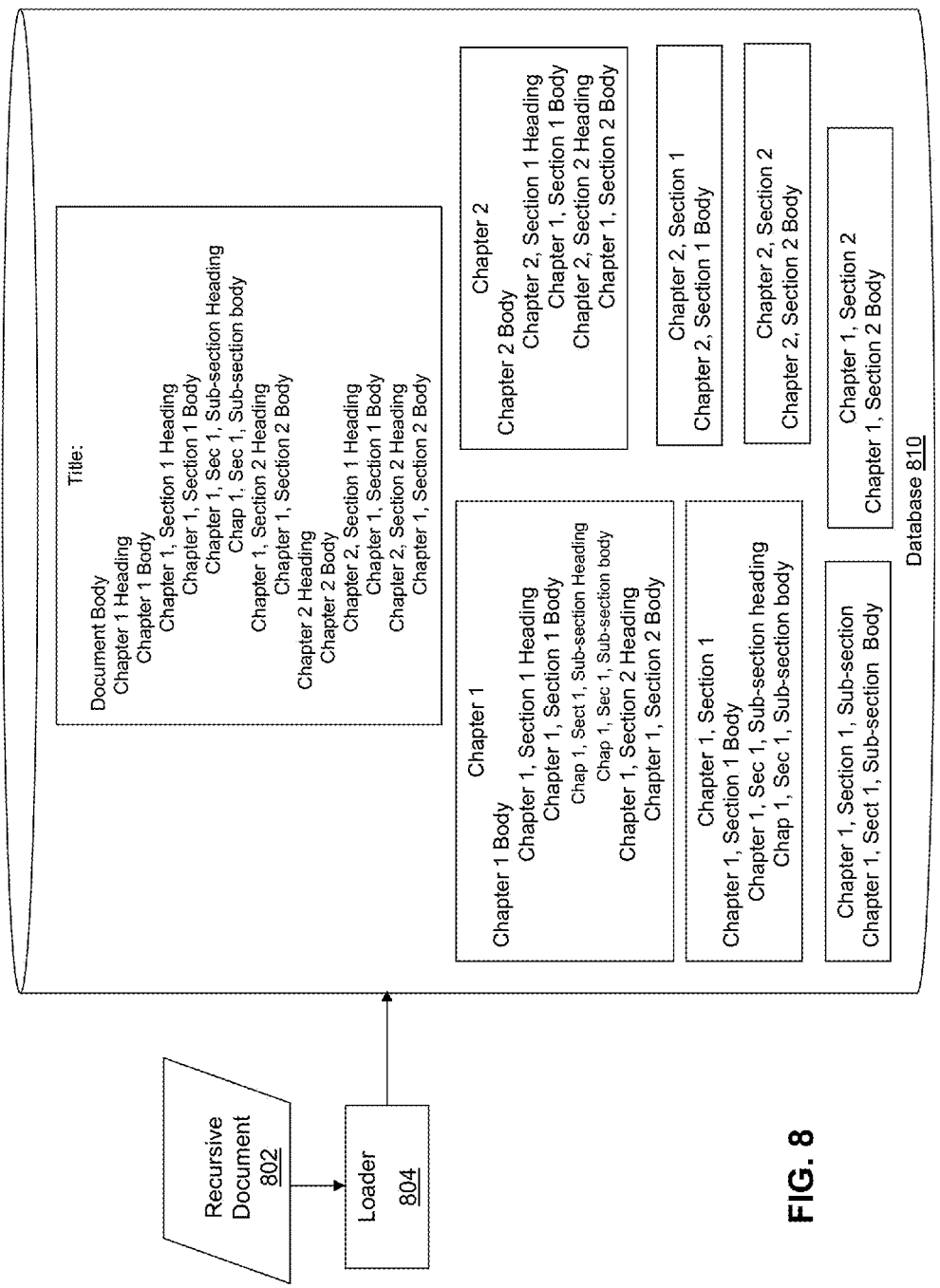
FIG. 8 illustrates the loading process.

FIG. 8 illustrates this process with respect to the documents illustrated for FIGS. 1A-I. The recursive JSON document 802 is processed by the loader 804 to create multiple flattened documents that are loaded into the database 810. The different flattened documents correspond to each level identified in the JSON file, and which may be accessed by the user when viewing the document. For example, with respect to the views illustrated in FIGS. 1A-I, this means that a different flattened document will be created pertaining to each of the "Title", "Chapter 1", "Chapter 1, Section 1", "Chapter 1, Section 1, Sub-section", "Chapter 1, Section 2", "Chapter 2", Chapter 2, Section 1", and "Chapter 2, Section 2" portions of the document.

Figure 9:
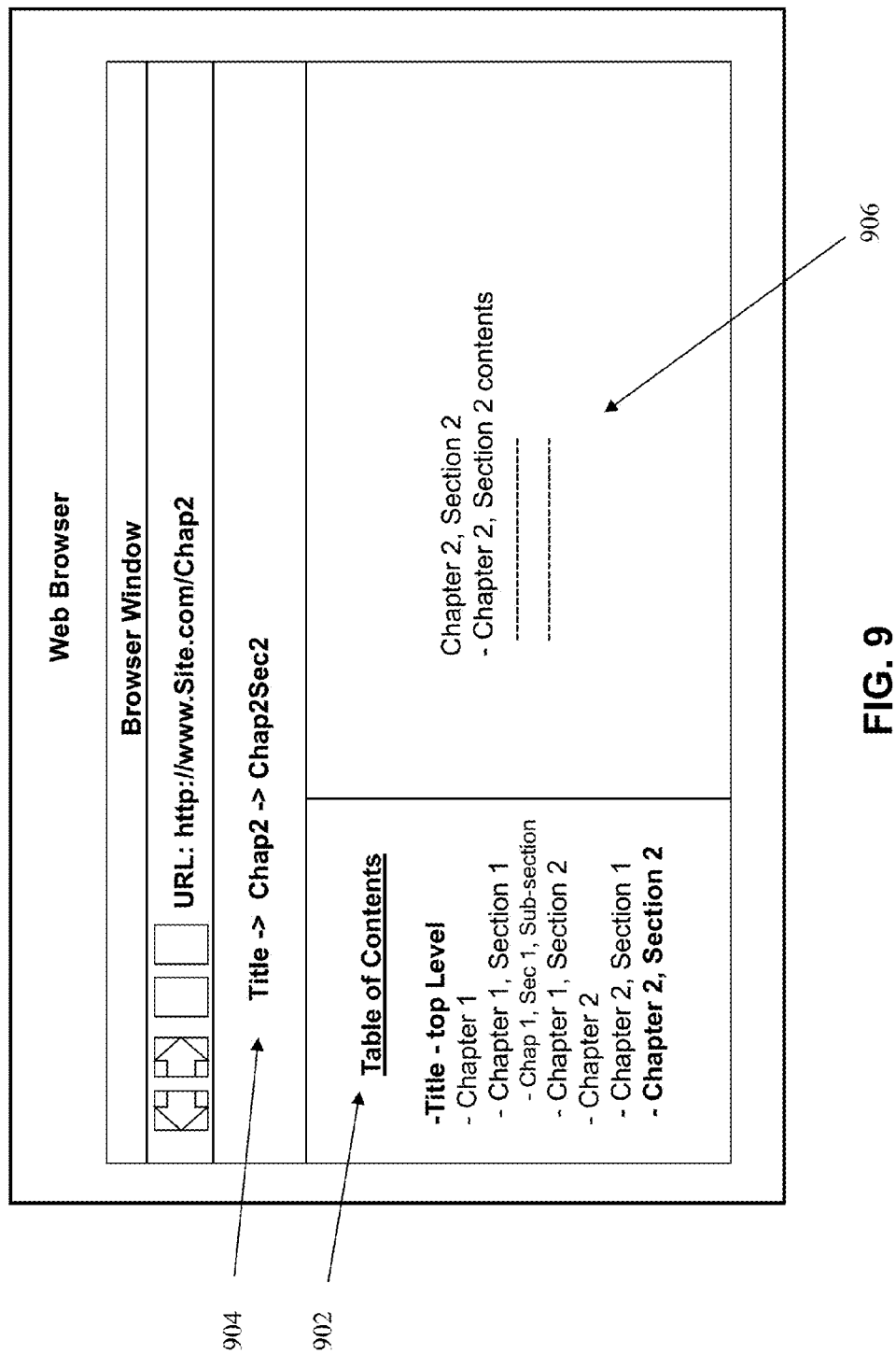
FIG. 9 shows an example of an interface that can be used to view the documents/chunks by a user.

The first document is a direct flattened representation of the JSON document which can be referred to as the "Super Document". Only these documents are presented in the list view and are considered documents in their own right, and have a directly corresponding PDF and ePUB. Additionally, however, the additional documents can be created for purposes of searching, viewing, and linking. This is done in a generic fashion for all document types which conform FIG. 9 shows an example of an interface that can be used to view the documents/chunks by a user. Parent chunks are accessible through the table of contents 902 and breadcrumb navigation 904 that is defined in the document 906. After moving to a parent chunk, the starting point chunk is included as a child. Any level of nesting present in the document is supported, and all are addressable. As noted above, the way this is accomplished is to create as one of the outputs of the publishing process a recursive JSON structure. This structure consists of a document containing the taxonomy previously described, as well as a list of documents. Each document in this list of documents can similarly contain its own optional taxonomy as well as a list of documents. As a part of or after the publishing process, this JSON document is processed by a loader, which recursively parses the document and translates it into flat documents representing all different levels of the document structure. Each of these documents is then loaded into the database and indexed separately by a search engine. This makes it very easy to search and present documentation at any level of granularity desired as well as to link from one granularity level to another. Furthermore, an auto-complete search can operate much more efficiently on smaller levels of granularity, while an advanced search can operate well at all granularities. A further refinement of the approach could operate in a more storage efficient manner if storage size is a concern.

In the real world, different users may need different levels of documentation at different times. The varying levels of granularity in the present invention allow for search results to more accurately present a document properly scoped to the user's needs. For example: (1) A new user may want to browse a complete high level document; (2) An experienced user may want a small chunk with a particular item of information.; (3) A developing user may want an intermediate sized chunk that has subject/sequence affinity; (4) A support technician may need to provide a chunk scoped at an intermediate level to a customer so they are not overloaded with too much information, but also not given too little.

In addition, dynamic chunking supports well-documented "information foraging" behavior much better than the granular presentation approach while preserving addressability that is lacking in monolithic presentation.

Therefore, what has been described is an improved approach to author and present information to users.

SYSTEM ARCHITECTURE OVERVIEW

Figure 10:
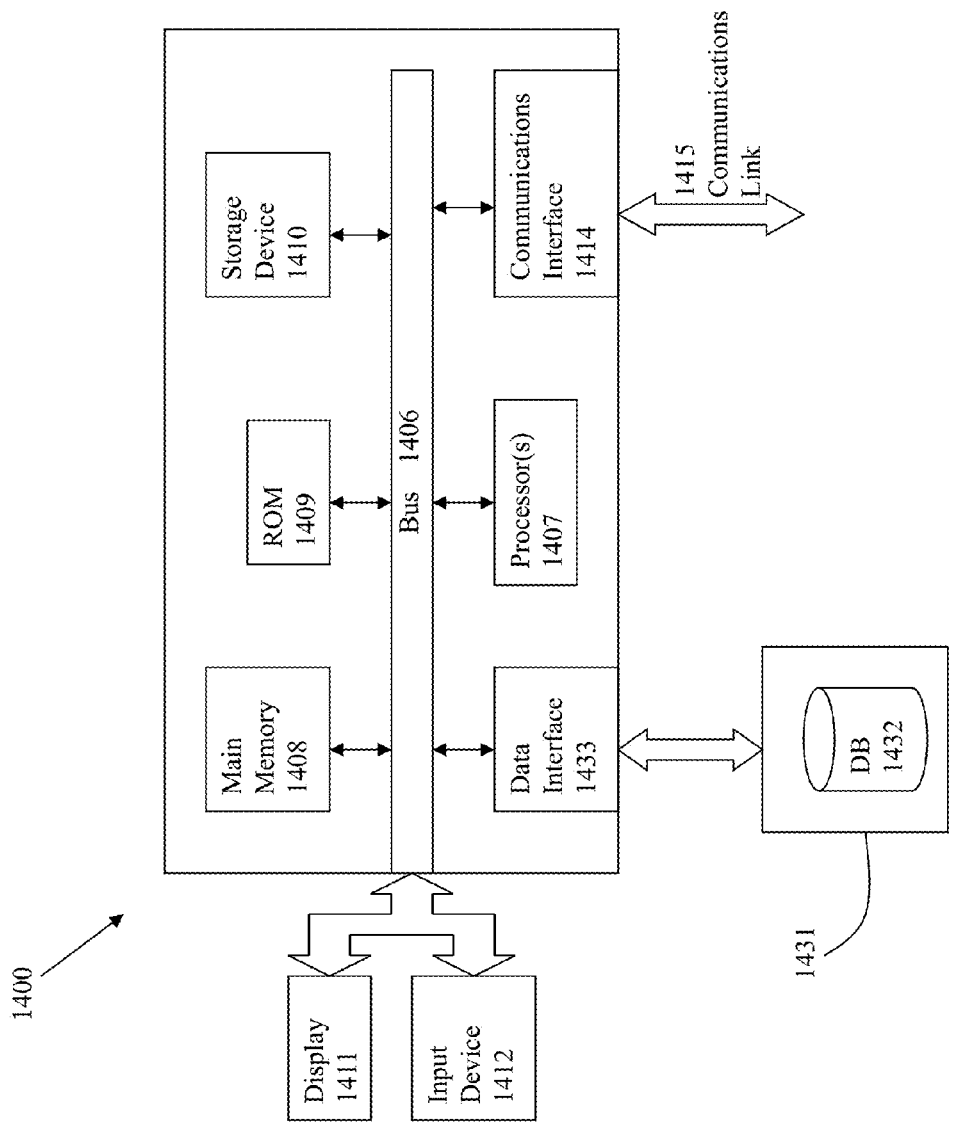
FIG. 10 is a block diagram of an example computing system suitable for implementing an embodiment of the present invention.

FIG. 10 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be stored in a database 1432 on a storage medium 1431 which is accessed through data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method implemented with a processor, comprising:
generating a plurality of flattened documents corresponding to different of levels of a plurality of levels of a source document prior to providing access to the plurality of flattened documents corresponding to the source document, respective documents of the plurality of flattened documents comprise at least flattened contents for a highest level of the respective document and a recursive concatenation of flattened contents for sub-levels to the highest level of the respective document, wherein the plurality of flattened documents are generated by recursively processing a hierarchical document to concatenate content of a respective document level and contents of any sub-levels;
maintaining the plurality of flattened documents in a database prior to providing access for display;
identifying a first flattened document of the plurality of flattened documents maintained in the database for display having a plurality of different levels; and
displaying, for each level of the plurality of levels, all of the contents of a respective level as well as all sublevels to that level inline, wherein addressability for the plurality of different levels is preserved.

2. The method of claim 1, wherein:
the plurality of flattened documents are associated with a global table of contents and respective documents of the plurality of flattened documents comprise at least the global table of contents;
the hierarchical document is generated using at least an XHTML document, the hierarchical document comprises at least a plurality of portion having a plurality of attributes, the plurality of portion corresponding to the plurality of different levels, at least one attribute of the plurality of attributes being inheritable by a child level from a parent level, a first attribute of the plurality of attributes comprising a title attribute, a second attribute of the plurality of attributes comprising a document access permission, the document access permission being selected from a public access permission value and a private access permission value, the plurality of portion include ordered lists of a corresponding ancestor hierarchy comprising a list of unique keys for respective ancestors, corresponding title attribute values are converted into a links to corresponding documents of the plurality of flattened documents;
the XHTML document is generated using a plurality of content chunks and a map, the content chunks comprising at least content for display, and the map comprising a representation of a hierarchy and interrelation of the plurality of content chunks;
the addressability is preserved by using an address comprising a unique key and a corresponding reference maintained in a corresponding portion of the hierarchical document; and
the plurality of flattened documents are indexed for searching.

3. The method of claim 1, comprising:
publishing one or more source files into a recursive document; and
loading the plurality of flattened documents from transforming the recursive document.

4. The method of claim 3, wherein the recursive document is recursively processed to generate the plurality of flattened documents.

5. The method of claim 4, wherein a specific level is processed by concatenating content for the specific level with content for its lower hierarchical levels.

6. The method of claim 3, wherein publishing comprises:
identifying the source files;
converting the source files to XHTML; and
generating the recursive document.

7. The method of claim 3, wherein loading comprises:
parsing the recursive document;

flattening at every level of the recursive document to generate the plurality of flattened documents; and loading the plurality of flattened documents into a database.

8. A non-transitory computer readable medium having stored thereon a sequence of instructions which, when executed by a processor causes the processor to execute a method, the method comprising:

generating a plurality of flattened documents corresponding to different of levels of a plurality of levels of a source document prior to providing access to the plurality of flattened documents corresponding to the source document, respective documents of the plurality of flattened documents comprise at least flattened contents for a highest level of the respective document and a recursive concatenation of flattened contents for sub-levels to the highest level of the respective document, wherein the plurality of flattened documents are generated by recursively processing a hierarchical document to concatenate content of a respective document level and contents of any sub-levels;

maintaining the plurality of flattened documents in a database prior to providing access for display;

identifying a first flattened document of the plurality of flattened documents maintained in the database for display having a plurality of different levels; and displaying, for each level of the plurality of levels, all of the contents of a respective level as well as all sublevels to that level inline, wherein addressability for the plurality of different levels is preserved.

9. The computer readable medium of claim 8, wherein:

the plurality of flattened documents are associated with a global table of contents and respective documents of the plurality of flattened documents comprise at least the global table of contents;

the hierarchical document is generated using at least an XHTML document, the hierarchical document comprises at least a plurality of portion having a plurality of attributes, the plurality of portion corresponding to the plurality of different levels, at least one attribute of the plurality of attributes being inheritable by a child level from a parent level, a first attribute of the plurality of attributes comprising a title attribute, a second attribute of the plurality of attributes comprising a document access permission, the document access permission being selected from a public access permission value and a private access permission value, the plurality of portion include ordered lists of a corresponding ancestor hierarchy comprising a list of unique keys for respective ancestors, corresponding title attribute values are converted into a links to corresponding documents of the plurality of documents;

the XHTML document is generated using a plurality of content chunks and a map, the content chunks comprising at least content for display, and the map comprising a representation of a hierarchy and interrelation of the plurality of content chunks;

the addressability is preserved by using an address comprising a unique key and a corresponding reference maintained in a corresponding portion of the hierarchical document; and the plurality of flattened documents are indexed for searching.

10. The computer readable medium of claim 8, wherein the sequence of instructions, when executed by a processor, further causes the processor to perform:

publishing one or more source files into a recursive document; and loading the plurality of flattened documents from transforming the recursive document.

11. The computer readable medium of claim 10, wherein the recursive document is recursively processed to generate the plurality of flattened documents.

12. The computer readable medium of claim 11, wherein a specific level is processed by concatenating content for the specific level with content for its lower hierarchical levels.

13. The computer readable medium of claim 10, wherein the sequence of instructions, when executed by a processor, further causes the processor to perform publishing by:

identifying the source files;

converting the source files to XHTML; and generating the recursive document.

14. The computer readable medium of claim 10, wherein the sequence of instructions, when executed by a processor, further causes the processor to perform loading by:

parsing the recursive document;

flattening at every level of the recursive document to generate the plurality of flattened documents; and loading the plurality of flattened documents into a database.

15. A system, comprising:

a memory having stored thereon a sequence of instructions; and a processor, wherein the process is capable of executing the sequence of instructions for:

generating a plurality of flattened documents corresponding to different of levels of a plurality of levels of a source document prior to providing access to the plurality of flattened documents corresponding to the source document, respective documents of the plurality of flattened documents comprise at least flattened contents for a highest level of the respective document and a recursive concatenation of flattened contents for sub-levels to the highest level of the respective document, wherein the plurality of flattened documents are generated by recursively processing a hierarchical document to concatenate content of a respective document level and contents of any sub-levels;

maintaining the plurality of flattened documents in a database prior to providing access for display;

identifying a first flattened document of the plurality of flattened documents maintained in the database for display having a plurality of different levels; and displaying, for each level of the plurality of levels, all of the contents of a respective level as well as all sublevels to that level inline, wherein addressability for the plurality of different levels is preserved.

16. The system of claim 15, wherein:

the plurality of flattened documents are associated with a global table of contents and respective documents of the plurality of flattened documents comprise at least the global table of contents;

the hierarchical document is generated using at least an XHTML document, the hierarchical document comprises at least a plurality of portion having a plurality of attributes, the plurality of portion corresponding to the plurality of different levels, at least one attribute of the plurality of attributes being inheritable by a child level from a parent level, a first attribute of the plurality of attributes comprising a title attribute, a second attribute of the plurality of attributes comprising a document access permission, the document access permission being selected from a public access permission value and a private access permission value, the plurality of portion include ordered lists of a corresponding ancestor hierarchy comprising a list of unique keys for respective ancestors, corresponding title attribute values are converted into a links to corresponding documents of the plurality of flattened documents;

the XHTML document is generated using a plurality of content chunks and a map, the content chunks comprising at least content for display, and the map comprising a representation of a hierarchy and interrelation of the plurality of content chunks;

the addressability is preserved by using an address comprising a unique key and a corresponding reference maintained in a corresponding portion of the hierarchical document; and the plurality of flattened documents are indexed for searching.

17. The system of claim 15, wherein the sequence of instructions, when executed by the processor, further causes the processor to perform:

publishing one or more source files into a recursive document; and loading the plurality of flattened documents from transforming the recursive document.

18. The system of claim 17, wherein the recursive document is recursively processed to generate the plurality of flattened documents.

19. The system of claim 18, wherein a specific level is processed by concatenating content for the specific level with content for its lower hierarchical levels.

20. The system of claim 17, wherein the sequence of instructions, when executed by the processor, further causes the processor to perform publishing by:

identifying the source files;

converting the source files to XHTML; and generating the recursive document.

21. The system of claim 17, wherein the sequence of instructions, when executed by the processor, further causes the processor to perform loading by:

parsing the recursive document;

flattening at every level of the recursive document to generate the plurality of flattened documents; and loading the plurality of flattened document into a database.

* * * * *